United States Patent [19]

Klug

[11] 3,719,663

[45] March 6, 1973

[54] PREPARATION OF CELLULOSE ETHERS

[75] Inventor: Eugene D. Klug, Wilmington, Del.

[73] Assignee: Hercules Incorporated, Wilmington, Del.

[22] Filed: June 7, 1971

[21] Appl. No.: 150,709

[52] U.S. Cl.....260/231 R, 260/231 A, 260/231 CM, 260/232
[51] Int. Cl..............................................C08b 11/00
[58] Field of Search.......260/231 R, 231 A, 231 CM, 232; 106/194

[56] References Cited

UNITED STATES PATENTS

| | | | |
|---|---|---|---|
| 2,517,835 | 8/1950 | Branan et al. | 260/231 |
| 2,498,208 | 2/1950 | Houk et al. | 260/232 |
| 2,555,224 | 5/1951 | Decker | 106/194 |
| 2,912,431 | 11/1959 | Leonard et al. | 260/232 |
| 3,347,689 | 10/1967 | Futami et al. | 106/194 |

FOREIGN PATENTS OR APPLICATIONS 587,328  4/1947  Great Britain......................260/232

Primary Examiner—Donald E. Czaja
Assistant Examiner—Ronald W. Griffin
Attorney—William S. Alexander

[57] ABSTRACT

An improved process is provided for preparing cellulose ethers of the viscosity desired. Their viscosity is regulated during or after the etherification reaction used in their preparation. The viscosity regulating agents used are an organic hydroperoxide in conjunction with a metal catalyst. Now preferred are tert butyl hydroperoxide in conjunction with a cobalt or manganese salt.

9 Claims, No Drawings

PREPARATION OF CELLULOSE ETHERS

This invention relates to a process of preparing cellulose ethers and more particularly to a process of adjusting, controlling or regulating the viscosity of cellulose ethers either during or after the etherification reaction used in their preparation.

For many applications it is desirable to be able to prepare cellulose ethers of low viscosity. Existing processes for accomplishing this are not as satisfactory as desired. These prior art processes and their drawbacks will not be summarized.

1. Start with a special cellulose of the required degree of polymerization which will yield a product for each viscosity type desired. This is very impractical because it requires keeping on hand a large number of grades of cellulose.
2. Age alkali cellulose in the presence of air. One of the many disadvantages of this process is the long time required, from several hours for as long as two days.
3. Add a viscosity regulating agent either alone or plus certain metal catalysts initially so that a large part of the degradation occurs in the alkali/cellulose stage and the early part of the etherification reaction. The viscosity regulating agents comprise hydrogen peroxide ad alkali metal hypohalites, peroxides and periodates. The metal catalysts comprise a salt of a metal including manganese, cobalt, iron or other transition metal. Although this is a good process and has been commercially used, the extent to which the viscosity may be reduced and the efficiency of the process are limited.

According to the present invention it has been found that the foregoing disadvantages are overcome or at least minimized and the viscosity of the cellulose ethers are satisfactorily regulated during preparation thereof, by reaction of a mixture of alkali and cellulose with an etherifying agent, by carrying out the process which comprises adding to the reaction mixture of an alkali and cellulose with an etherifying agent an organic hydroperoxide and a salt of a metal of manganese, cobalt, iron, or other transition metal, and conducting said reaction in the presence thereof. Although regulating the viscosity of the cellulose ethers during the etherification reaction is preferred since it is more efficient, the invention is also applicable to regulating the viscosity of the cellulose ethers after etherification has been completed.

Reducing the viscosity after the etherification proper has been completed may be accomplished by treatment of either the crude etherification reaction mixture or the purified product in a suitable diluent. In some cases, e.g., in the preparation of carboxymethylcellulose (CMC), it is possible to conduct the viscosity reduction on the crude CMC. However in other cases, e.g., in the preparation of water soluble hydroxyethylcellulose (HEC), it is preferred to reduce the viscosity after purification because the lower molecular weight product is very soluble in the purification solvents and therefore difficult to isolate from them. In any case the organic hydroperoxide and metal catalyst are added to an aqueous or organic solvent slurry of the cellulose ether and the slurry is heated for about 0.5–6 hours at a temperature of about 70°C. – 140°C. The viscosity reducing agent can be added at any time during or after the process of preparing the cellulose ether as long as there is sufficient time to accomplish the amount of viscosity reduction desired. In during preparation of viscosity reduction, preferably it is added at the start (i.e., alkali cellulose stage). In after preparation of viscosity reduction, preferably it is added to the purified ether.

The terms "degree of substitution" ("D.S." and "M.S.") used herein are well understood. There are three hydroxyl groups in each anhydroglucose unit in the cellulose molecule. D.S. is the average number of hydroxyl groups substituted in the cellulose per anhydroglucose unit. M.S. is the average number of molecules of reactant combined with the cellulose per anhydroglucose unit.

The following examples illustrate specific embodiments of the present invention. These examples are not intended to limit the present invention beyond the scope of the claims. In the examples and elswhere herein parts, percent and ratios are by weight, and the amount of alkali is the total amount based on sodium hydroxide, unless otherwise specified. All viscosities were determined with a standard Brookfield LVF Synchrolectric viscometer at 25°G., and in water unless otherwise specified. Where viscosity is given as greater than 100,000 cps it means that it was beyond the capacity of the viscometer and therefore too high to measure, and usually the dispersion of the material formed a solid mass.

EXAMPLE 1 HPC

Example 1 shows using this invention to regulate the viscosity of hydroxypropyl cellulose (HPC) during its preparation.

A pressure reactor equipped with agitator was charged as follows:

| Ingredient | Parts |
| --- | --- |
| Cellulose | 1.0 |
| Total NaOH | 0.31 |
| Heptane | 17 |
| Tert butanol | 3.0 |
| Water | 0.45 |
| TBHP$^{(a)}$ | 0.24 |
| Cobalt (added as CoCl$_2$) | $50 \times 10^{-6}$ $^{(b)}$ |

(a) tert butyl hydroperoxide
(b) 50 ppm based on the cellulose

The reaction mixture was stirred for one hour at room temperature after which 3.4 parts of propylene oxide was added. The air in the reactor was displaced with nitrogen and the reaction mixture was heated to 70°C. in 1 hour and kept at 70°C. for 16 hours. The heptane liquor was filtered off. The filter cake was slowly added to hot (85°C. – 95°C.) water with stirring, the heptane flashing off, and the alkali was neutralized with acetic acid. The HPC product was then washed thoroughly with hot water and dried. The dried HPC had excellent solubility in water and in alcohol. It had an M.S. of 3.7. A 10 percent aqueous solution had a viscosity of 70 cps. The viscosity of a 10 percent HPC aqueous solution prepared under the same conditions without regulation was greater than 100,000 cps.

EXAMPLES 2 – 6 HPC

The effectiveness of this invention and the influence of catalyst in regulating the viscosity of HPC during its preparation are illustrated in Table I below. The same process conditions given above for Example 1 were used except as otherwise shown. The M.S. of the products was about 4.

TABLE I

| Ex. | Variable | Viscosity, cps. (10% solution) |
|---|---|---|
| 2 | TBHP % Cobalt | 70 |
| 3 | No organic hydroperoxide nor metl catalyst | > 100,000 |
| 4 | TBHP but no catalyst | 2,935 |
| 5 | TBHP & Manganese[a] | 105 |
| 6 | TBHP & Iron[b] | 550 |

(a) Added as manganous sulfate
(b) Added as ferrous chloride in combination with citric acid as a chelating agent.

EXAMPLES 7– 10 HPC

The effect of alkali/cellulose ratio on viscosity regulation during preparation of HPC, HPC quality and M.S. is given in Table II below. Except as otherwise shown (primarily said ratios and recipe given below) the process conditions of Example 1 were used. The following recipe was used.

| Ingredient | Parts |
|---|---|
| Cellulose | 1.0 |
| Heptane | 17 |
| Tert butanol | 1.4 |
| Water | 0.45 |
| TBHP | 0.08 |
| Cobalt (added as $CoCl_2$) | $50 \times 10^{-6}$ [a] |
| Propylene oxide | 3.0 |

(a) 50 ppm based on the cellulose

Table II

| Ex. | Total NaOH/ Cell. | Viscosity, cps[a] 10% Solution | Water Solubility | Hydroxypropyl MS |
|---|---|---|---|---|
| 7 | 0.115 | 270 | good | 3.3 |
| 8 | 0.135 | 170 | good | 3.5 |
| 9 | 0.185 | 100 | good | 4.1 |
| 10 | 0.235 | 85 | good | 4.05 |

(a) without viscosity regulation 10% solution viscosities of HPC products were >100,000 cps.

Organic hydroperoxides have acidic characteristics and during the course of their decomposition consume a certain amount of NaOH. It is therefore desirable to add additional NaOh up to approximately one mole per mole of organic hydroperoxide being used over and above the normal amount of NaOH used where viscosity reduction is not being carried out.

As is well known, the alkali/cellulose ratio employed during preparation of cellulose ethers varies greatly depending upon the derivative being prepared. For example, in the preparation of hydroxypropyl cellulose with an M.S. above 2.0 the preferred ratio of NaOH/cellulose is in the range of about 0.05/1 – 0.2/1. Thus, when an organic hydroperoxide is added at a ratio of 0.25 parts per part of cellulose to reduce the viscosity during etherification approximately a molar equivalent amount of excess alkali is added to neutralize the hydroperoxide decomposition products and the preferred ratio of NaOH/cellulose is increased to the range of about 0.15/1 – 0.30/1. For preparing HEC without viscosity reduction the preferred alkali/cellulose ratio is in the range of about 0.35/1 – 0.4/1, and when an organic hydroperoxide at the above mentioned ratio is added to reduce the viscosity during etherification the preferred range of NaOH/cellulose is increased slightly to about 0.4/1 – 0.5/1. On the other hand, for preparation of carboxymethylcellulose of a D.S. of 0.8 the preferred range of NaOH/cellulose without viscosity reduction is in the range of about 0.5/1 – 0.6/1, and when an organic hydroperoxide at the above mentioned ratio is added to reduce the viscosity during etherification the preferred range of NaOH/cellulose is increased slightly to about 0.55/1 – 0.65/1. For ethyl cellulose preparation in which a large excess of alkali is used (about 5/1 – 7/1 ratio of NaOH to cellulose) little or no adjustment is needed to compensate for the hydroperoxide.

When the viscosity reduction is carried out using an organic hydroperoxide following etherification, no alkali need be added but the presence of a small amount will increase the efficiency of the viscosity reduction process. Thus, depending upon the amount of organic hydroperoxide used in the viscosity reduction operation, alkali (expressed as NaOH) in the weight ratio of cellulose of up to about 0.2 and usually about 0.05 – 0.2 may be added.

If an alkali other than NaOH, e.g., KOH or LiOH, is employed it will be understood that the weight ratio in relation to the cellulose should be adjusted to provide substantially the same molar amount of alkali.

EXAMPLES 11 – 14 HPC

A comparison of TBHP of this invention with prior art $H_2O_2$ viscosity regulating agent during preparation of HPC is given in Table III below. Except as otherwise shown the same process conditions of Example 1 were used.

In Examples 11–14 the weight ratios to cellulose were heptane 17, tert butanol 1.4, and propylene oxide 3.0. In Examples 13 and 14 the higher $H_2O$ input shown resulted from the water present in the 30 percent $H_2O_2$ used. In these two pairs of substantially identical examples at two different levels of viscosity regulating agent, prior art $H_2O_2$ gave products having 24 and 53 times the viscosities of products prepared with TBHP according to this invention.

Table III

| | Parts per part Cellulose | | | | | Viscosity, cps[b] 10% Solution | Hydorxy- propyl MS |
|---|---|---|---|---|---|---|---|
| Ex. | CO[a] | $H_2O_2$ | TBHP | Total NaOH | $H_2O$ | | |
| 11 | $50 \times 10^{-6}$ | 0.08 | | 0.22 | 0.45 | 5560 | 3.6 |
| 12 | $50 \times 10^{-6}$ | | 0.08 | 0.22 | 0.45 | 230 | 3.5 |
| 13 | $50 \times 10^{-6}$ | 0.24 | | 0.255 | 0.59 | 3170 | 3.1 |
| 14 | $50 \times 10^{-6}$ | | 0.24 | 0.255 | 0.59 | 60 | 3.1 |

(a) 50 ppm based on the cellulose and added as $CoCl_2$
(b) without viscosity regulation 10% solution viscosities of HPC products were >100,000 cps.

EXAMPLES 15–18 HPC

Using substantially the same process conditions of Example 1 except where otherwise indicated, Examples 15–18 compare TBHP with other organic hydroperoxides in the preparation of HPC. Propylene oxide/cellulose ratio was 3.0 and the amount of cobalt was 50 ppm based on the cellulose (added as $CoCl_2$). The HPC products had an M.S. of about 3.5. Further details are given in Table IV below.

TABLE IV
Hydroperoxides

| Ex. | Name | Ratio to cellulose | Viscosity, cps. 10% solution |
|---|---|---|---|
| 15 | p-menthane hydroperoxide[a] | 0.153 | 190 |
| 16 | diisopropylbenzene hydroperoxide[b] | 0.173 | 905 |
| 17 | cumene hydroperoxide[c] | 0.128 | 660 |
| 18 | tert butyl hydroperoxide (TBHP) | 0.080 | 80 |

(a) added as 50% concentrate in p-methane
(b) added as 50% concentrate in diisopropylbenzene
(c) added as 75% concentrate in cumene and dimethylbenzyl alcohol These ratios of organic hydroperoxides to cellulose in Table IV above represent 0.00089 gram mole of hydroperoxide per gram of cellulose or about 0.145 mole hydroperoxide per anhydroglucose unit of the cellulose. Although TBHP was the most efficient, the other organic hydroperoxides tested were quite satisfactory and far more efficient than the leading prior art hydrogen peroxide viscosity regulator. This is evident from Examples 15–18 which show that viscosities of 190–905 cps. were obtained at organic hydroperoxide ratios of 0.128–0.173, whereas by contrast hydrogen peroxide at the much higher ratio to cellulose of 0.24 (0.007 gram mole per gram cellulose) gave a viscosity of 3170 cps. (Example 13). Without viscosity regulating agent the viscosity was greater than 100,000 cps.

EXAMPLES 19 – 21 Modified HPC

Use of this invention in regulating the viscosity of HPC ethers modified with other etherification agents during their preparation is shown in Table V below. The process conditions used in making these ethers were substantially identical with those used in making the unmodified HPC ethers of Example 1 with the following exceptions. The modifier reagent was added along with the propylene oxide. In the benzyl modification an additional amount of NaOH was added equal to one mole of NaOH per mole of benzyl chloride.

TABLE V

| Ex. | Modification | Modifier Reagent | Modifier Reagent Cell | Modifier[a] Substitution | Viscosity[b] cps 10% Solution |
|---|---|---|---|---|---|
| 19 | Benzyl | Benzyl Chloride | 0.2 | 0.11 | 110 |
| 20 | Aminoethyl | Ethyleneimine | 0.125 | 0.18 | 37 |
| 21 | Phenyl Hydroxyethyl | Styrene oxide | 0.525 | 0.12 | 345 |

(a) In each Example the hydroxypropyl substitution (M.S.) was approximately 4.
(b) The viscosities of 10% aqueous solutions of these modified HPC ethers before viscosity reduction were greater than 100,000 cps.

The comparison between the efficiency of TBHP of this invention and the leading prior art $H_2O_2$ as viscosity regulating agents in Examples 19–21 was substantially the same as is shown for Examples 11 – 14.

EXAMPLES 22–24 HEC

Examples 22–24 show using this invention to regulate the viscosity of alkali soluble hydroxyethyl cellulose (HEC) during its preparation.

A slurry consisting of one part wood pulp, 10 parts tert butyl alcohol, 1.6 parts water, 50 ppm cobalt based on wood pulp (added as $CoCl_2$) and the indicated amounts of NaOH and TBHP was stirred for 1 hour. Then 0.27 part ethylene oxide was added, the air was displaced with nitrogen and the reaction mixture was heated in a pressure vessel to 70°C. in 1 hour and kept at 70°C. for 3 hours.

The HEC products were neutralized with nitric acid, washed free of salts with 80 percent acetone and dried. The M.S. of the HEC was 0.6.

Solutions of the HEC were prepared in 5 percent NaOH for viscosity measurements. Table VI below gives further details.

TABLE VI

| Ex. | Total NaOH/ Cellulose | Cobalt/ cellulose[a] | TBHP/ cellulose | Viscosity, cps. 10% Solution in 5% NaOH |
|---|---|---|---|---|
| 22 | 0.34 | Zero | Zero | 17,540[b] |
| 23 | 0.37 | 50 | .08 | 80 |
| 24 | 0.44 | 50 | .16 | 27 |

(a) ppm cobalt based on cellulose (added as $CoCl_2$)
(b) 8% solution, a 10% solution was greater than 100,000 cps.

EXAMPLES 25 – 28
CARBOXYMETHYLCELLULOSE (CMC)

Use of this invention in regulating the viscosity of CMC during its preparation is shown in Table VII below.

A slurry of 1 part wood pulp, 9.8 parts isopropanol, 1.53 parts water, 50 ppm cobalt based on the cellulose (added as $CoCl_2$) and the indicated amounts of TBHP and NaOH were stirred for 45 minutes at room temperature. Then 0.64 part monochloroacetic acid was added and the slurry was stirred at room temperature for 15 minutes. The air was displaced with nitrogen and with continued stirring the reaction mixture was heated to 70°C. in one hour and kept at that temperature for three hours. The products were worked up by neutralizing the alkali with acetic acid, washing with 80 percent methanol, dehydrating with anhydrous methanol and drying at 70°C. in vacuo.

TABLE VII

| Ex. | tt Total NaOH/cell | TBHP/cell. | Viscosity, cps. 10% Solution | carboxymethyl D.S. |
|---|---|---|---|---|
| 25 | 0.575 | 0.04 | 14550 | .75 |
| 26 | 0.605 | 0.12 | 1600 | .78 |
| 27 | 0.65 | 0.24 | 700 | .81 |
| 28 | 0.55 | Zero | >100,0000 | .76 |

EXAMPLES 29 – 34 ETHYL CELLULOSE

Examples 29–34 show using this invention to regulate the viscosity of organosoluble ethyl cellulose during its preparation.

A pressure vessel equipped with mechanical agitator was charged with 1 part wood pulp, 11.4 parts 60 percent NaOH, 4.4 parts ethyl chloride and the indicated amount of TBHP. Each run contained 50 ppm cobalt based on the cellulose (added as $CoCl_2$). The air was displaced with nitrogen and the vessel was heated with agitation to 130°C. in 40–60 minutes and kept at 130°C.–140°C. for 2¼ hours. The pressure was then released, venting of byproducts diethyl ether and ethanol to the recovery system. The ethyl cellulose product was water washed free of salts and alcohols and dried. It has an ethoxyl DS of about 2.5; 5 percent solutions were prepared in a 4 to 1 by weight toluene-alcohol mixture and their viscosities measured. Table VIII below gives further details.

TABLE VIII

| ex. | TBHP/cellulose | total NaOH/cellulose | Viscosity, cps. 5% Soultions |
|---|---|---|---|
| 29 | Zero | 6.8 | >2000 (gel) |
| 30 | 0.013 | 6.8 | >2000 (gel) |
| 31 | 0.025 | 6.8 | 45 |
| 32 | 0.050 | 6.8 | 10.6 |
| 33 | 0.10 | 6.8 | 5.0 |
| 34 | 0.20 | 6.8 | Too low to measure |

EXAMPLES 35–38 HPC

Examples 35–38 show using this invention to regulate the viscosity of HPC after the etherification rection.

One part of HPC of MS 4 and a viscosity of 350 cps. in 2 percent aqueous solution was used in these examples. Slurries of 1 part HPC, 40 parts water, 40 ppm cobalt on the HPC (added as $CoCl_2$) and the indicated amounts of other reagents were stirred 2 hours at 87°C. Then the slurries were neutralized with acetic acid and the HPC products were washed with hot water (85°C.–T°C) and dried. Table IX below gives further details.

TABLE IX

| Example | 35 | 36 | 37 | 38 |
|---|---|---|---|---|
| TBHP/HPC | 0.10 | 0.10 | 0.10 | 0.10 |
| Total NaOH/HPC | zero | 0.02 | 0.04 | 0.06 |
| Viscosity after treatment (2%) | 120 | 30 | 24 | 23 |

EXAMPLES 39–45

Examples 39–45 show using this invention to regulate the viscosity of water soluble HEC after the etherification reaction.

One part water soluble HEC OF M.S. 2.5 and viscosities in 2 percent and 5 percent aqueous solution of 6000 and greater than 100,000 cps respectively was charged into a stirred reactor with 3.2 parts of 96 percent acetone, 50 ppm cobalt based on HEC (added as $CoCl_2$) and the indicated amount of TBHP. The air in the vessel was displaced with nitrogen and the reaction mixture was heated for 0.5 hour at 120°C. and then dried. Table X below gives further details.

TABLE X

| Ex. | TBHP/HEC | Viscosity, cps 2% solution | Viscosity, cps 5% solution |
|---|---|---|---|
| 39 | 0.05 | 19 | 200 |
| 40 | 0.04 | 22 | 240 |
| 41 | 0.03 | 32 | 420 |
| 42 | 0.01 | 55 | 1200 |
| 43 | 0.005 | 73 | 1640 |
| 44 | 0.0025 | 1240 | >100,000 |
| 45 | zero | 6000 | >100,000 |

EXAMPLE 46 CMC

This example shows use of this invention in regulating the viscosity of CMC by adding a viscosity regulating agent (TBHP) at the end of the etherification reaction but before the CMC has been purified and recovered.

A slurry of 1.0 part cellulose, 0.58 part NaOH and 11.2 parts of 87 percent isopropanol was stirred for 45 minutes at 25°C–30°C. Then 0.64 part monochloroacetic acid dissolved in 0.64 part of 87 percent isopropanol was added and the reaction mixture was heated to 70°C. in 30 minutes, and maintained at 70°C. for 90 minutes. To the resulting crude CMC was added 0.5 part TBHP and 50 ppm cobalt based on the cellulose (added as $CoCl_2$). Then the mixture was heated an additional 30 minutes at 70°C.

The resulting viscosity regulated CMC product was neutralized with acetic acid, purified by washing with 80 percent methanol and dried. The CMC product had a D.S. of 0.78. A 2 percent aqueous solution has a viscosity of 69 cps and a 10 percent aqueous solution had a viscosity of 11,000 cps. In contrast to this, 2 percent aqueous and 5 percent aqueous solutions of an identical CMC product prepared by the same process, except not subjected to the treatment with TBHP and cobalt, had viscosities of 800 cps and greater than 100,000 cps respectively.

Viscosity regulating agents applicable herein include organic hydroperoxides together with certain metal catalysts. The organic hydroperoxides include, e.g., tert butyl hydroperoxide (TBHP), cumene hydroperoxide, p-menthane hydroperoxide, diisopropylbenzene hydroperoxide. The organic hydroperoxide viscosity regulating agents are normally available and are used as concentrated solutions in organic solvents. For example, TBHP may be obtained as a 70–90 percent solution in water (90 percent solutions used in the examples). Cumene hydroperoxide is available as a 79–85 percent solution in cumene and dimethylbenzyl alcohol (75 percent solutions used in the examples). Diisopropylbenzene hydroperoxide and p-menthane hydroperoxide are available as approximately 50 percent concentrates in the corresponding hydrocarbons. In all the examples the quantities employed are expressed on a 100% basis.

The preferred metal catalysts comprise salts of manganese and cobalt, although salts of iron, lead, vanadium, copper and other transition metals may be employed. Salts of the metals which may be employed include, e.g., the chloride, nitrate, acetate, bromide, sulfate, naphthenate. The metal salts may also be used in chelated form. Various chelating agents are effective, e.g., ethylenediamine tetraacetic acid, gluconic acid, citric acid, pyrophosphoric acid.

Tert butyl hydroperoxide used in conjunction with a manganese or cobalt salt is a preferred viscosity reducing agent.

The amount of organic hydroperoxide can vary over a wide range. It depends on a number of factors including the extent of degradation desired, the molecular weight of the starting cellulose, and the particular organic hydroperoxide used. Generally, an organic hydroperoxide/cellulose or cellulose ether weight ratio of about 0.002–0.5, preferably about 0.025–0.25, gives products of the desired viscosity for most uses.

The amount of metal catalyst (calculated as the metal and based on the cellulose) can vary over a wide range. The amount depends on a number of factors including those in the immediately preceding paragraph plus the partciular catalyst used. Generally about 10–100 ppm based on the cellulose or cellulose ether, preferably about 25–50 ppm, metal catalyst gives products of the desired viscosity for most uses.

This invention is applicable to the preparation of cellulose ethers, including water soluble, alkali soluble and/or organo soluble, prepared by prior art slurry (i.e., in presence of inert organic diluent) or nonslurry (i.e., in absence of inert organic diluent) processes, although it is particularly applicable in making water soluble cellulose ethers by conventional slurry processes. Typical celulose ethers include, e.g., hydroxyethyl cellulose ethers (e.g., hydroxyethyl cellulose, hydroxypropyl cellulose), carboxyalkyl cellulose hydroxyethyl (e.g., carboxymethylcellulose), alkyl cellulose ethers (e.g., methyl cellulose, ethyl cellulose), mixed cellulose ethers for instance carboxyalkyl hydroxyalkyl cellulose ethers (e.g., carboxymethyl hydroxyethyl cellulose, carboxymethyl hydroxypropyl cellulose), alkyl hydroxyalky cellulose ethers (e.g., ethyl hydroxyethyl cellulose, methyl hydroxypropyl cellulose), those in parenthesis being the most typical individual compounds.

The time-temperature conditions for carrying out the etherification reactions on cellulose need not be modified from those conventionally used to utilize the improvement of this invention whereby the molecular weight of the cellulose is decreased during its conversion to an ether derivative. When the organic hydroperoxide is added initially to the cellulose-alkali-etherification agent mixture the viscosity reduction probably occurs rapidly under the etherification conditions, being essentially completed during the early stages of the reaction. Alternatively the hydroperoxide can be added at any time during the etherification reaction as long as a reaction time of at least about ½ hr. at a temperature of at least about 70°C. is provided to effect the viscosity reduction reaction.

If the viscosity reduction is carried out on the cellulose ether derivative subsequent to the completion of the etherification reaction, a reaction period in the range of about ½ to 6 hrs. at a temperature of about 70°C.–140°C. is used depending on the derivative and amount of hydroperoxide used as well as the degree of viscosity reduction desired.

What I claim and desire to protect by Letters Patent is:

1. In the preparation of a cellulose ether by reaction of a mixture of alkali and cellulose with an ether-ifying agent, the improvement which comprises regulating the viscosity of the cellulose ether by adding to the reaction mixture, per part of cellulose, 0.002 to 0.5 part of an organic hydroperoxide and 10 to 100 parts of a transition metal, per million parts of cellulose, and conducting said reaction in the presence thereof, said metal being added in the form of a salt.

2. Process of reducing the viscosity of a cellu-lose ether which comprises heating same in the presence of per part of cellulose, 0.002 to 0.5 part of an organic hydro-peroxide and 10 to 100 parts of a transition metal per million parts of cellulose ether, said metal being added in the form of a salt.

3. In the preparation of a cellulose ether by reaction of a mixture of alkali and cellulose with an etherifying agent, the improvement which comprises regulating the viscosity of the cellulose ether by adding to the reaction mixture, per part of cellulose, 0.002 to 0.5 part of an organic hydroperoxide and 10 to 100 parts of manganese or cobalt per million parts of cellulose and conducting said reaction in the presence thereof, said manganese or cobalt being added in the form of a salt.

4. Process of claim 1 wherein the organic hydroperoxide is tert butyl hydroperoxide.

5. Process of claim 1 wherein the cellulose ether is hydroxypropyl cellulose, carboxymethylcellulose or ethyl cellulose and the organic hydroperoxide is tert butyl hydroperoxide.

6. Process of reducing the viscosity of a cellulose ether which comprises heating same in the pre-sence of, per part of cellulose ether, 0.002 to 0.5 part of an organic hydroperoxide, and 10 to 100 parts of manganese or cobalt per million parts of cellulose ether, said manganese or cobalt being added in the form of a salt.

7. Process of claim 6 wherein the organic hydroperoxide is tert butyl hydroperoxide.

8. Process of claim 6 wherein the cellulose ether is hydroxypropyl cellulose, carboxymethylcellulose ether cellulose and the organic hydroperoxide is tert butyl hydroperoxide.

9. Process of claim 6 wherein the cellulose ether is hydroxyethyl cellulose and the organic hydroperoxide is tert butyl hydroperoxide.

* * * * *

UNITED STATES PATENT OFFICE
CERTIFICATE OF CORRECTION

Patent No. 3,719,663         Dated March 6, 1973

Inventor(s) Eugene D. Klug (Case 21)

It is certified that error appears in the above-identified patent and that said Letters Patent are hereby corrected as shown below:

Column 1, line 27; "ad" should read --and--

Column 2, line 27; "25°G." should read --25°C.--

Column 3, Table 1; "TBHP % Cobalt" should read --TBHP & Cobalt--

Column 3, line 3 under Table I; "metl" should read --metal--

Column 6, Table VII;

TABLE VII

| Ex. | tt Total NaOH/cell | TBHP/cell. | Viscosity, cps. 10% Solution | carboxy-methyl D.S. |
|---|---|---|---|---|
| 25 | 0.575 | 0.04 | 1455 | 0.75 |
| 26 | 0.605 | 0.12 | 160 | 0.78 |
| 27 | 0.65 | 0.24 | 70 | 0.81 |
| 28 | 0.55 | Zero | >100,000 | 0.76 | should read

Table VII

| Ex. | Total NaOH/Cell. | TBHP/Cell. | Viscosity, cps. 10% Solution | Carboxymethyl D.S. |
|---|---|---|---|---|
| 25 | 0.575 | 0.04 | 1455 | 0.75 |
| 26 | 0.605 | 0.12 | 160 | 0.78 |
| 27 | 0.65 | 0.24 | 70 | 0.81 |
| 28 | 0.55 | Zero | >100,000 | 0.76 |

PO-1050
(5/69)

UNITED STATES PATENT OFFICE
CERTIFICATE OF CORRECTION

Patent No. 3,719,663  Dated March 6, 1973

Inventor(s) Eugene D. Klug (Case 21)  Page 2

It is certified that error appears in the above-identified patent and that said Letters Patent are hereby corrected as shown below:

Column 7, line 33; "(85°C.-T°C) should read --85°C.-90°C)--

Column 9, line 8; "particiular" should read --particular--

Column 9, line 19, " celulose" should read --cellulose--

Column 9, lines 19 & 20; "hydroxyethyl" should read --hydroxyalkyl--

Column 9, line 22; "hydroxyethyl" should read --ethers--

Column 9, line 27; "hydroxyalky" should read --hydroxyalkyl--

Column 10, Claim 8, line 45; "ether" should read --or ethyl--

Column 10, Claim 1, line 2; Claim 2, lines 1 & 4; Claim 6, line 2; several words have been hyphenated in the middle of sentences which is incorrect.

Signed and sealed this 25th day of December 1973.

(SEAL)
Attest:

EDWARD M. FLETCHER, JR.
Attesting Officer

RENE D. TEGTMEYER
Acting Commissioner of Patents